United States Patent Office 2,891,928
Patented June 23, 1959

2,891,928
MAGNESIUM AND IODINE CATALYSTS FOR POLYESTER PREPARATION

Joseph B. Dickey and Theodore E. Stanin, Kingsport, Tenn., assignors to Eastman Kodak Company, Rochester, N.Y., a corporation of New Jersey No Drawing. Application December 21, 1953
Serial No. 399,604

4 Claims. (Cl. 260—75)

This invention relates to a process for preparing polyesters which comprises condensing a diester of a dicarboxylic acid with a polyhydroxy compound in the presence of a novel catalytic condensing agent consisting of metallic magnesium activated with iodine, i.e. magnesium in conjunction with iodine. This novel catalytic condensing agent can be advantageously employed in the preparation of linear polyesters wherein the dicarboxylic acid is an aromatic compound which does not contain any ethylenic (olefinic) unsaturation and the polyhydroxy compound is a dihydroxy compound. In preparing such linear polyesters it is advantageous to conduct the condensation in an inert atmosphere at an elevated temperature which is increased during the course of the condensation up to a temperature of from about 225° to about 310° C., the condensation being conducted during the latter stages thereof at a very low subatmospheric pressure.

This application contains subject matter disclosed to some extent in copending applications, Serial Nos. 313,061, 313,066, 313,067 and 313,068, which were filed on October 3, 1952; these applications are now U.S. Patents No. 2,744,089, No. 2,744,094, No. 2,744,095, and No. 2,744,096, granted on May 1, 1956, to John R. Caldwell.

Various polyesters of dicarboxylic acids and polyhydroxy compounds are well known in the prior art and have been used, for example, in the manufacture of paints and varnishes. Moreover, prior art disclosures set forth various linear condensation polyesters derived from dihydroxy compounds and dibasic acids such as terephthalic acid which are capable of being drawn into fibers showing by characteristic X-ray patterns, orientation along the fiber axis. However, many of these linear polyesters possess a relatively low melting point and a fairly considerable solubility in various solvents whereby they are of restricted utility, especially in the textile field. These polyesters vary considerably in their characteristics, depending on the particular dicarboxylic acid and the particular polyhydroxy compound employed. Generally speaking, these polyesters have various physical characteristics which are not as satisfactory as could be desired.

The preparation of polyesters is well known in the prior art and involves the reaction of a dibasic dicarboxylic acid with a dihydric or polyhydric alcohol. It is advantageous to employ esters of the dicarboxylic acid whereby ester interchange takes place with the glycol or polyhydric alcohol to form a polyester and an alcohol. When using the ester interchange method, the time required to form the polyesters is generally considerably less than when the free dicarboxylic acid is employed. The long chain in the polyester is built up by a series of ester interchange reactions wherein the glycol displaces a relatively low-boiling alcohol component of the acid ester to form a glycol ester. During the last stages of the reaction, it is generally desirable to heat the condensing reaction mixture to a temperature of about 225°–275° C. or higher in order to maintain the fluid state. For this reason, the properties of the catalytic condensing agent are very important.

A desirable catalytic condensing agent must be active enough to promote ester interchange at a temperature below the boiling point of the glycol or other polyhydric alcohol. At the same time, the catalyst must be stable at temperatures of 225°–310° C., or even higher if necessary. Furthermore, the catalyst must not cause decomposition or degradation of the polyester at these high temperatures.

In accordance with this invention it has been found that metallic magnesium which has been activated with or employed in conjunction with a small amount or free iodine is especially valuable for use as a catalytic condensing agent in the preparation of high melting linear polyesters.

The ester-interchange catalysts which have been employed in accordance with the prior art include sodium, potassium, lithium, calcium, and other metals which facilitate the ester-interchange reaction so that it proceeds with considerable rapidity; however, the resultant polyesters produced are frequently insoluble and infusible. Under the influence of magnesium metal as a catalyst as described in the prior art, the reaction rate is slower than for many of the other metallic catalysts, but the products produced are seldom insoluble and infusible. The greater length of time when magnesium metal is employed at the necessary high temperature requires extraordinary precautions, particularly in regard to the exclusion of air in order to obtain resins which are free from decomposition products. Such decomposition products not only discolor the polyester resins but also are responsible for inferior physical properties in the resultant polyesters. It was quite surprising to find that the addition of a small amount of free iodine to the reaction catalyzed with magnesium metal greatly accelerates the reaction and thus minimizes the formation of objectionable decomposition products by shortening the duration of heating at high temperatures. It appears that the iodine activates the magnesium whereby its effectiveness as a catalyst is greatly improved. The activation of magnesium can also be accomplished by treating the metal with iodine vapors prior to introducing the metal into the reaction mixture from which the polyesters are to be produced.

The activated magnesium can be prepared prior to introducing the catalyst into the reaction mixture as described in the next paragraph or the magnesium can be incorporated into the reaction mixture and a small quantity of iodine added thereto to bring about activation of the catalyst. In the latter event the concentration of iodine employed is not critical. Any excess quantity of iodine is rapidly disposed of by evaporation under the reaction conditions. Advantageously, the amount of iodine employed is from about 10% to about 50% based on the weight of magnesium being employed as the catalyst. The iodine can be added to the reaction mixture along with the entire amount of magnesium being employed all at one time or portions of the magnesium and the iodine or either one can be added intermittently during the course of the reaction if desired. Somewhat smaller and considerably higher proportions of iodine based on the weight of the magnesium can be advantageously employed although in general lower proportions will considerably reduce the catalytic effectiveness and higher proportions may be unnecessarily excessive.

One of the most efficacious ways which can be advantageously employed for the activation of magnesium with iodine consists in heating at about 75°–150° C. a piece of magnesium ribbon in iodine vapors. It is not known exactly what chemical or physical changes are brought about by the iodine vapors on contact with the surface of the metallic magnesium nor is it certain how much of the iodine vapor is absorbed or adsorbed upon the surface of the magnesium. This heating in iodine vapor can also be conducted at higher or lower temperatures. Magnesium can be employed in the form of powder, shavings, turnings, ribbon or any other convenient form. When the metallic magnesium is heated in the presence of iodine vapors, the metal should be reasonably clean and in sufficient contact with the vapors for a long enough period of time to permit the reasonable degree of activation. Advantageously, a period of a few minutes will generally suffice although considerably shorter or longer periods can also be employed.

The novel catalysts of this invention give a very rapid reaction rate at all stages of the polyesterification process, including the final step where the molecular weight is built up. They are particularly valuable for the preparation of high melting polyesters from 1,6 hexanediol and 1,5-pentenediol. It is well known that these glycols have a tendency to decompose at temperatures above 250–260° C. and hence are difficult to use. With the novel catalysts described above polyester reactions employing these glycols can be carried out at temperatures up to 300° C. or even higher without excessive decomposition.

The novel catalysts can, in general, be employed for the preparation of substantially all polyesters involving an ester interchange reaction between a dicarboxylic acid ester and a glycol or glycol ester. The catalysts are especially valuable for the preparation of polyesters that melt above about 240° C., as for example, polyethylene terephthalate. The process of the invention is applicable to all of the polyesters described herein.

By employing the novel catalysts of this invention, the reaction rate of the polyesterification process can be increased by a factor which is several times the reaction rate obtainable when catalysts known in the prior art are employed. Moreover, the novel catalysts of this invention have the valuable characteristic of minimizing side reactions which have the tendency of causing considerable degradation of the polyester products at the relatively high temperatures employed in preparing highly polymeric polyesters. Furthermore, by employing these novel catalysts to increase the rate of condensation, the time available for possible decomposition of the high molecular weight polyester molecules being formed at high temperatures is appreciably reduced. Thus, by increasing the reaction rate, the time required to make a polyester is reduced which is quite important because at 250°–300° C. the degree of color formation and extent of deleterious side reactions is proportional to the time of heating.

The polyesters produced when employing these novel catalyts have greatly improved properties as compared to products obtained employing catalysts known in the prior art. The molecular weight is considerably enhanced whereby highly polymeric polyesters are obtained. The color of the polyesters obtained is excellent; the products can therefore be employed for purposes calling for white or colorless materials. The physical properties of the polyesters obtained are also superior. At high temperatures there is a great improvement in the intrinsic viscosities of linear polyesters which are suitable for melt spinning or extrusion whereby fibers, films, etc. can be produced having properties superior to those obtainable with known catalysts.

The herein described novel catalysts are especially valuable for the preparation of polyesters employing diesters of p,p′-sulfonyl dibenzoic acid as described in copending applications filed on October 3, 1952, by J. R. Caldwell, such as have been mentioned hereinabove.

Many of these polyesters are very high melting and the reaction must often be carried out at a temperature of 280°–300° C. or higher. It has been found that relatively few catalysts are effective at this temperature other than those described in this application.

It is an object of this invention to provide new and improved catalytic condensing agents for promoting the formation of improved polyesters in processes involving ester interchange and alcoholysis. A further object of this invention is to provide a new and improved method for the preparation of polyesters wherein such new and improved catalysts are employed. Other objects will become apparent elsewhere in this specification.

A broad aspect of this invention relates to a process for preparing a polyester which comprises condensing under substantially anhydrous conditions at an elevated temperature in an inert atmosphere a diester of a dicarboxylic acid with from about 1 to about 10 equivalent proportions of a polyoxy compound, in the presence of a novel catalyst as defined herein.

More specifically, this invention relates to a process for preparing a polyester comprising (A) condensing under substantially anhydrous conditions an aromatic dicarboxylic acid diester having the formula:

$$R_1OOC-R_2-X-R_3-COOR_4$$

wherein $R_1$ and $R_4$ each represents a substituent selected from the group consisting of an alkyl radical containing from 1 to 10 carbon atoms and an omega-hydroxyalkyl radical containing from 2 to 12 carbon atoms, $R_2$ and $R_3$ each represents $(CH_2)_{n-1}$ wherein $n$ is a positive integer of from 1 to 5 inclusive and X represents a divalent aromatic radical selected from the group having the following formulas:

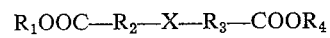

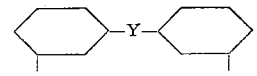

and

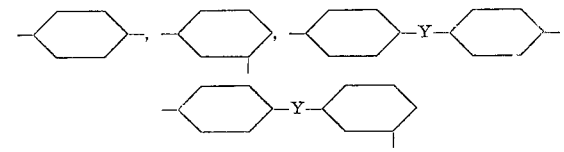

wherein Y represents a divalent radical selected from the group consisting of

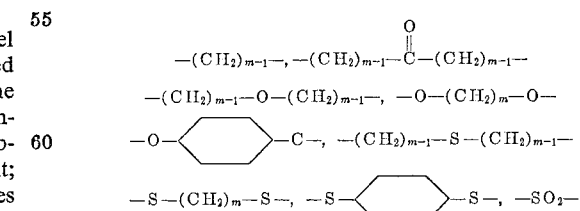

and

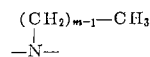

wherein $m$ is a positive integer of from 1 to 5 inclusive, (B) with a dioxy compound selected from the group consisting of those compounds having the following formulas:

and

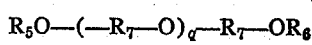

wherein p represents a positive integer of from 2 to 12 inclusive, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and q represents a positive integer of from 1 to 10 inclusive, the dioxy compound being employed in such a proportion that there is at least an equivalent amount of oxy substituents in proportion to the carbalkoxy substituents in the overall combination of the aromatic diesters and the dioxy compounds, (C) in the presence of a condensing agent selected from the group consisting of metallic magnesium in conjunction with free iodine, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

Advantageously, the novel catalysts are employed in an amount of from about 0.005% to about 1% based on the weight of the aromatic dicarboxylic acid diester. Higher and lower proportions can also be employed.

Advantageously, the polyoxy compound is employed in such a proportion that there are from about 1.2 to about 3 oxy substituents in proportion to the carbalkoxy substituents in the overall combination of the aromatic diesters and the dioxy compounds. Higher and lower proportions can also be employed.

Advantageously, the temperature employed during the earlier part of the condensation is from about 150° to about 220° C. Higher and lower temperature can also be employed.

Advantageously, the low pressure defined under (F) is less than about 15 mm. of Hg pressure (preferably less than 5 mm.). However, somewhat higher pressures can also be employed.

Most advantageously, the aromatic dicarboxylic acid diester is a diester of p,p'-sulfonyl dibenzoic acid or terephthalic acid and the polyoxy compound is a polymethylene glycol.

This invention also includes processes as described above whereby polyesters can be prepared by replacing a part of the described aromatic dibasic acid diester with an ester of a replacement acid which can be an aliphatic dibasic acid, e.g. carbonic acid, oxalic acid, succinic acid, adipic acid, sebacic acid, α,α-dimethylglutaric acid, dimethylmalonic acid, diglycollic acid, β-oxydipropionic acid, γ-oxydibutyric acid, maleic acid, fumaric acid, itaconic acid, etc. Similarly, other esterified acidic modifiers can also be incorporated in conjunction with or in lieu of these replacement acid esters, e.g. linoleic acid, linolenic acid, fatty acids of linseed oil, soybean oil, cottonseed oil, tung oil, etc. The process described above for the general practice of this invention need not be appreciably modified when such partial replacement acid esters are employed in conjunction with the aromatic dibasic acid esters except when they are unsaturated and tend to form insoluble and infusible products due to cross-linkage effects, in which event the process described hereinabove is advantageously terminated at an intermediate temperature of about 250° C. before the pressure is reduced whereby products are obtained which can be called soluble intermediate polyesters which are useful in preparing protective coatings. The various polyesters containing replacement acid esters as described in this paragraph can be prepared according to procedures similar to those described in copending applications filed on October 3, 1952, by J. R. Caldwell, such as have been mentioned hereinabove.

Polyesters can also be prepared in accordance with this invention by replacing a part of the described dioxy compound with what can be called a polyhydroxy compound which contains 3 or more hydroxy radicals, e.g. glycerol, sorbitol, pentaerythritol, dipentaerythritol, β-methylglycerol, 2-methyl-2(hydroxymethyl)-1,3-propanediol, 1,2,4-trihydroxybutane, etc. In the preparation of polyesters employing these polyhydroxy compounds, the reaction mixture is not generally heated to the high temperatures under reduced pressure as described hereinabove since the product would become insoluble and infusible due to cross-linking of the molecules; hence, the process is halted at about 250° C. or less prior to the reduction in pressure of the inert atmosphere. Various solutions can then be prepared from these intermediate polyester products which can then be cast into films or otherwise used in protective coating compositions. In preparing such intermediate polyester products it is generally advantageous to employ an unsaturated aliphatic dibasic acid diester in lieu of a part of the described aromatic dibasic acid diesters, e.g. maleic, fumaric and itaconic diesters.

The dioxy or polyoxy compounds defined above may not actually contain any free hydroxy radicals since they may be in esterified form as indicated by the formulas of the dioxy compounds set forth above. These hydroxy or substituted hydroxy radicals are referred to generically as oxy radicals or substituents. Each diester is considered as containing two carbalkoxy radicals as that term is employed in the definition of the process as described above since $R_1$ and $R_4$ may be alkyl radicals, or omega-hydroxyalkyl radicals. Even when the process is preceded by the preliminary step described below employing free acids, the term carbalkoxy radicals in the description of the process is intended to encompass such free carboxy radicals.

Furthermore, this invention covers processes as defined above wherein the aromatic dicarboxylic acid diester is formed by a preliminary step comprising condensing an aromatic dicarboxylic acid having the formula:

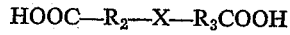

(wherein $R_2$, $R_3$ and X are defined under (A) in the above-described process), with a polyoxy compound which is defined above under (B) and is employed in the proportions set forth under (B), at an elevated temperature, after which preliminary step the novel catalytic condensing agent which is defined under (C) is added and the condensation is completed as defined under (D), (E) and (F). Advantageously, the elevated temperature employed during the preliminary step is substantially that at which reflux conditions subsist; however, higher and lower temperatures can also be used.

In preparing polyesters, especially linear highly polymeric polyesters, it is important to exclude oxygen and moisture at all stages of the condensation, particularly during the latter stages thereof. An inert atmosphere can be employed to exclude oxygen, e.g. it is advantageous to employ a hydrogen or a nitrogen atmosphere. The reacting materials employed in the condensation are advantageously substantially anhydrous; however, if water is initially present or is formed during the course of the condensation, it can be substantially completely removed prior to the final stages of the condensation by operating in accordance with the specified process.

Examples of aromatic dicarboxylic acid diesters which can be employed as defined above under (A) include the β-hydroxyethyl diester of p,p'-sulfonyl dibenzoic acid; p,p'-sulfonyl dibenzoic acid dibutyl ester; m,p'-sulfonyl dibenzoic acid dipropyl ester; m,m'-sulfonyl dibenzoic acid dihexyl ester; methyl terephthalate; hexyl terephthalate; isopropyl terephthalate; as well as various esters having the following formulas:

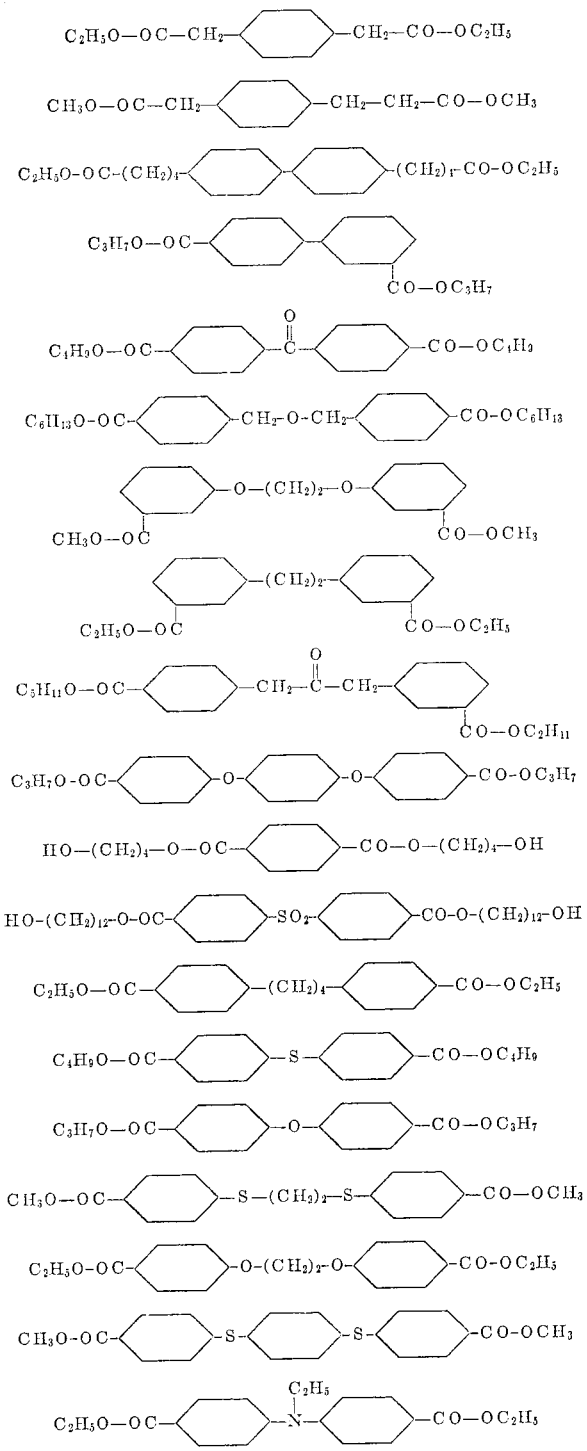

et cetera.

The dioxy compounds which can be employed to form highly polymeric linear polyesters include straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifieds. Examples of ether glycols include diethyle glycol, triethylene glycol, tetraethylene glycol, bis (4-hydroxybutyl) ether, bis (3-hydroxypropyl) ether, etc.

Valuable fibers can be advantageously prepared employing the higher melting polyesters which can be produced according to the procedures described herein. Preferably no aliphatic ether glycol is employed when fibers are to be prepared. Furthermore, the aromatic acid diesters should ordinarily contain only p,p'-linkages when highly polymeric linear polyesters are desired. However, on the other hand, valuable polyesters can be prepared employing aliphatic ether glycols without any alkylene glycol although the product obtained will not ordinarily be suitable for forming useful fibers. The same applies to the employment of aromatic diesters containing linkages in other than the para positions.

The temperature at which polyesterification can be conducted is dependent upon the specific reactants involved in any given reaction. In general, the reaction mixture can be heated with agitation at from about 150° to about 220° C. for from approximately one to three hours in an inert atmosphere (e.g. nitrogen or hydrogen); the mixture can then be heated with agitation at from about 225°–240° to about 280°–310° C. in the same atmosphere for approximately 1 to 2 hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately 1 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended.

The employment of the novel catalytic condensing agents results in better products being prepared in much less time than is possible when the catalysts of the prior art are employed.

The reaction can be carried out in the presence or absence of a solvent. Inert, high boiling compounds, such as diphenyl ether, diphenyl, mixed tolyl sulfones, chlorinated naphtholene, chlorinated diphenyl, dimethyl sulfolane, etc., can be used as the reaction medium.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which sets as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

*Example 1.—Terephthalic acid and ethylene glycol*

Forty-five grams of dimethyl terephthalate and 23 grams of ethylene glycol were warmed together in a 200-cc. flask until a clear solution was obtained. The flask was then equipped with a still head and a cooled receiver. A capillary tube was inserted through a rubber sleeve in the still head into the flask until the tip was below the surface of the liquid reaction mixture.

Then 0.1 gram of magnesium metal and a crystal of iodine weighing approximately 10 mg. was introduced into the reaction mixture. The reaction mixture was then heated for three hours in a metal bath at 197° C. during which time pure nitrogen was passed into the reaction mixture through the capillary tube. The temperature was then raised to 280° C. over a period of one hour whereupon 17 cc. of distillate consisting mainly of methanol was collected. The reaction mixture was then permitted to cool to 120° C. This concludes what can be designated as the first stage of the polyesterification reaction.

When the reaction mixture had cooled to 120° C., an additional 0.1 gram of magnesium and 10 mg. of iodine was added and the apparatus was then connected to a suitable vacuum pump and heated for five and a half hours at 280° C. under a pressure of from about 0.1 to about 0.5 mm. of Hg. The resulting product was a very viscous, light colored, clear melt from which fibers could be drawn with a glass rod. These fibers became strong and lustrous by simply drawing them between the fingers to about five times their original length. The resulting polyester resin had a melting point of about 255° C.

It is not necessary to add the additional quantity of catalyst during the second stage of the process. The initial catalyst remains active throughout the condensation reaction.

*Example 2.—p,p'-Sulfonyl dibenzoic acid and 1,10-decamethylene glycol*

Four hundred and twenty grams (1.0 mole) p,p'-sulfonyl dibenzoic acid dibutyl ester and 360 grams (2.0 mole) 1,10-decomethylene glycol were placed in a reaction vessel equipped with a stirrer, a short distilling column, and an inlet tube for purified hydrogen. A piece of magnesium ribbon ¼ inch long was heated in iodine vapors to activate it and introduced into the vessel as a catalyst. The mixture was stirred at 200–220° C. in an atmosphere of pure hydrogen. Butyl alcohol was distilled from the reaction mixture as the ester interchange proceeded. After three to four hours, the evolution of butyl alcohol came practically to a stop, and the temperature was then raised to 250–260° C. and held for two hours. A vacuum of 0.5 to 1.0 mm. was applied and the heating and stirring were continued for five to six hours. A colorless product having an inherent viscosity of 0.60 in a mixture of 60% phenol–40% tetrachloride was obtained. This polyester is soluble in gamma-butyrolactone, ethylene carbonate, and dimethyl sulfolane at 120–160° C. but separates from solution when cooled to room temperature. In the crystalline form, thep roduct shows a melting point of 200–210° C. on the hot stage of a polarizing microscope. When extruded as filaments and drafted, this polyester sticks on a hot bar at 170–180° C. This polyester is valuable for the production of photographic film base. It can also be used for electrical insulation.

*Example 3.—p,p'-Sulfonyl dibenzoic acid and dodecamethylene glycol*

The procedure described in Example 2 was repeated exactly except that a molecularly equivalent quantity (2.0 moles) of 1,12-dodecamethylene glycol was employed in lieu of the 1,10-decamethylene glycol. When extruded as filaments and drafted, these polyester fibers had a hot bar sticking temperature of about 170° C.

*Example 4.—Dimethyl isophthalate and ethylene glycol*

Four hundred and twenty grams (1.0 mol) p,p'-sulfonyl-dibenzoic acid dibutyl ester, 388 grams (2.0 mole) dimethyl isophthalate and 380 grams (6.0 mol) ethylene glycol were placed in a reaction vessel equipped with a stirrer, a short distillation column, and an inlet for purified hydrogen. Magnesium turnings (0.2 gram) were heated in iodine vapors to activate the surface and added as a catalyst. The reaction mixture was stirred at 190–195° C. in an atmosphere of hydrogen. A mixture of butyl alcohol and methyl alcohol distilled off and the reaction was 80–90% complete in three hours. The temperature was then raised to 270–275° and held for thirty minutes. A vacuum of 1.0 to 2.0 mm. was applied for five to six hours. The product obtained has an intrinsic viscosity of 0.5 to 0.6 in 60% phenol–40% tetrachlorethane solution. It softens at 220–230° C. It is suitable for the preparation of films, fibers, and molded objects.

*Example 5.—p,p'-Sulfonyl dibenzoic acid and diethylene glycol*

Four hundred and twenty grams (1.0 mol) of p,p'-sulfonyl dibenzoic acid dibutyl ester and 180 grams (1.7 mol) diethylene glycol were placed in a reaction vessel equipped with a stirrer, short distillation column, and inlet for purified hydrogen. A piece of magnesium ribbon, weighing about 0.1 gram was heated in iodine vapors to activate the surface and added to the reaction mixture. The mixture was stirred at 200–210° C. under an atmosphere of purified hydrogen until 80–90 percent of the butyl alcohol had distilled off. The temperature was then raised to 250° C. and held for one hour. A vacuum of 1.0 to 2.0 mm. of Hg pressure was applied, and heating and stirring were continued for eight to ten hours. The product obtained has an intrinsic viscosity of 0.6 to 0.7 in a mixture of 60% phenol–40% tetrachlorethane. The crystalline form of the polyester melts at 200–210° C. When extruded in the form of filaments and drafted, it sticks to the hot bar at 170–180°. The polymer is soluble in gamma-butyrolactone, ethylene carbonate, and dimethyl sulfolane at 100–150° C. It precipitates when the solutions are cooled to room temperature. The polyester is particularly suitable for the manufacture of photographic film base. It gives high strength films that show excellent dimensional stability and very low water absorption. The films can be prepared by melt extrusion methods. The polyester can also be used for electrical insulation on wires and in condensers. It can be extruded in the form of sheets, tubes, rods, etc.

*Example 6.—p,p'-Sulfonyl dibenzoic acid and diethylene glycol and ethylene glycol*

Four hundred and twenty grams (1.0 mol) of p,p'-sulfonyl dibenzoic acid dibutyl ester, 150 grams (1.4 mol) diethylene glycol, and 37 grams (0.6 mol) ethylene glycol were placed in a reaction vessel as described in Example 5. Magnesium turnings (0.2 g.) were activated by heating with iodine and were added to the reaction mixture. Stirring at 190–200° was continued until the evolution of butyl alcohol was substantially complete. The temperature was then raised to 260–270° C. and held for 1.5 hours. A vacuum of 2.0 to 3.0 mm. was applied for six hours. The polyester obtained shows a relatively wide softening range and tends to be non-crystalline. It is useful as a molding plastic. Fibers can also be prepared from this polyester.

*Example 7.—p,p'-Sulfonyl dibenzoic acid and triethylene glycol and ethylene glycol*

A polyester having the composition: 1.0 mol p,p'-sulfonyl-dibenzoic acid, 0.5 mol triethylene glycol, 0.5 mol ethylene glycol was prepared by exactly the same procedure described in Example 6 except that the glycol mixture employed in the reaction consisted of 1 mole of triethylene glycol and 1 mole of ethylene glycol. The polyester obtained is useful as a molding plastic; it has a relatively wide softening range and tends to be non-crystalline.

*Example 8.—p,p'-Sulfonyl dibenzoic acid, maleic anhydride, sebacic acid and hexamethylene glycol*

(a) 372 grams (1 mole) of p,p'-sulfonyl dibenzoic acid diethyl ester and 360 grams (3 moles) of hexamethylene glycol were placed in a reaction vessel as described in Example 5. A piece of magnesium ribbon weighing about 0.2 gram was activated by heating in iodine vapors and added as a catalyst. The mixture was stirred at 200–210° C. until the evolution of alcohol had practically come to a stop. 100 grams (1 mole) of maleic anhydride and 202 grams (1 mole) of sebabic acid were added. The temperature was maintained for an additional three hours. The polyester product obtained is soluble in dioxane, butyl acetate, toluene, and ethylene dichloride.

(b) A film was prepared employing the soluble polyester described in (a) of this example by dissolving it in dioxane and incorporating therein 2% weight of the polyester of cobalt naphthenate followed by coating the solution on a brass plate. The film was baked for 30 minutes at 120–140° C. The film obtained showed especially good resistance to water. A similar film was obtained employing an equivalent quantity of manganese oleate in lieu of the cobalt naphthenate.

It is readily apparent from the preceding examples that other polyesters of the types described hereinabove can be similarly prepared employing the novel catalysts of this invention. Moreover, the processes described herein can be carried out in a continuous manner instead of in batches. Suitable modifications in the description are readily apparent.

We claim:

1. A process for preparing a highly polymeric linear condensation-type polyester melting at above about 240° C. and having an inherent viscosity measured in 60% phenol plus 40% tetrachlorethane of at least 0.5 comprising heating a dialkyl ester of an aromatic dicarboxylic acid with a glycol containing from 2 to 12 carbon atoms wherein the alkyl radicals have from 1 to 4 carbon atoms and the acid is selected from the group consisting of terephthalic acid, isophthalic acid and p,p'-sulfonyldibenzoic acid, said heating being at a temperature of from about 150° to about 220° C. until the alcohol corresponding to said alkyl radicals is removed and at from about 225° to about 310° C. under a pressure of less than 15 mm. of Hg pressure during the last part of the heating period until said polyester is produced, said heating being performed with agitation in the presence of from about 0.005% to about 1% based on the weight of said ester of a condensing agent consisting of the combination of magnesium metal and from 10% to 50% by weight of the magnesium of free iodine.

2. A process as defined by claim 1 wherein said condensing agent consists of said magnesium metal heated with vapors of said iodine at about 75°–150° C.

3. A process as defined by claim 2 wherein said acid diester is dimethyl terephthalate and said glycol is ethylene glycol.

4. A process as defined by claim 1 wherein said acid diester is dimethyl terephthalate and said glycol is ethylene glycol.

References Cited in the file of this patent

UNITED STATES PATENTS

| | | |
|---|---|---|
| 2,249,950 | Fuller | July 22, 1941 |
| 2,465,319 | Whinfield et al. | Mar. 22, 1949 |

OTHER REFERENCES

Weygand: Organic Preparations, 1945, pp. 370–372. Copy in Div. 6.